June 19, 1934. A. R. HUETTIG 1,963,464
JOINT
Filed March 23, 1931
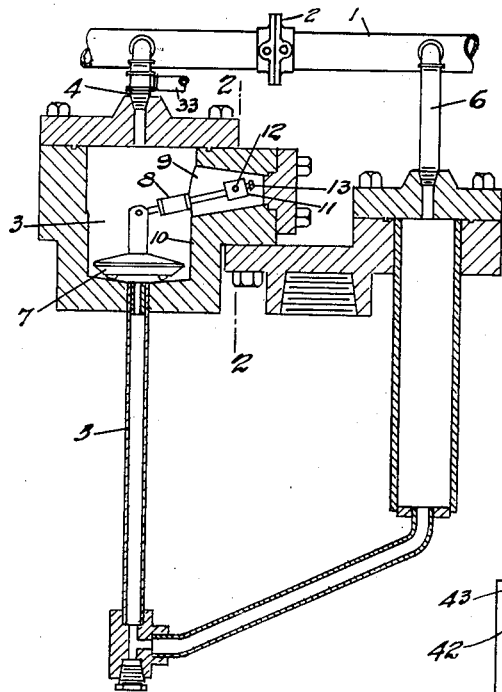
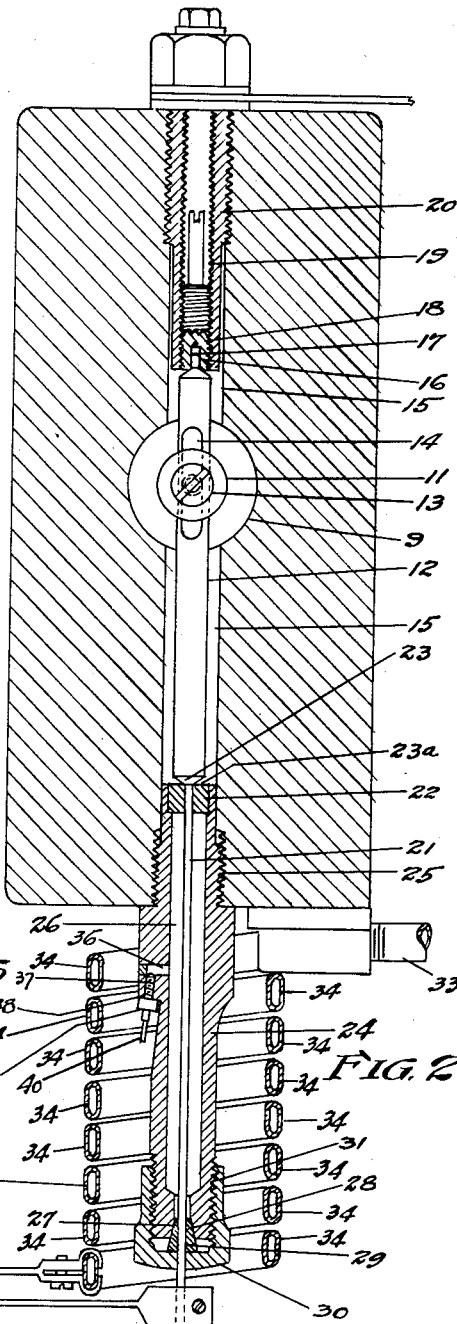
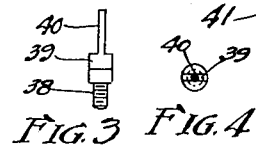
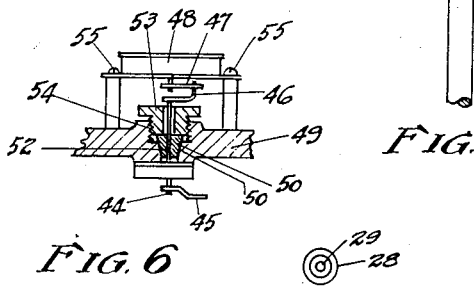
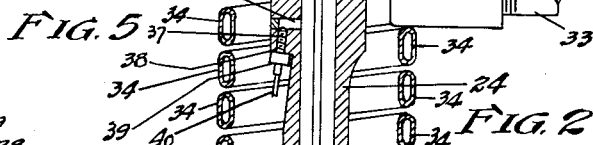
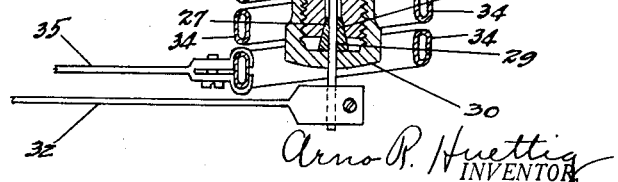

Patented June 19, 1934

1,963,464

UNITED STATES PATENT OFFICE 1,963,464

JOINT

Arno R. Huettig, Erie, Pa., assignor to American Meter Company, New York, N. Y., a corporation of Delaware Application March 23, 1931, Serial No. 524,557

5 Claims. (Cl. 308—70)

It is desirable in many situations to provide a very close fit for a spindle in its bearing. An example of such a situation is the spindle extending from the float chamber of an orifice meter, this spindle communicating the movement of the float to a pen arm. The driving power on the spindle is limited to the pressure that may be exerted by the float. On the other hand, under many conditions, the joint is subjected to a very high pressure, as for instance, several thousand pounds. Under these conditions, it is very difficult to maintain a joint which will afford free movement to the spindle and at the same time a joint which will maintain the pressure. There are also some environments where pressure is not involved, where it is desirable to maintain a very close fit between a spindle and its bearing and still provide for a free movement of the bearing. The present invention is designed to provide such a bearing in a simple and efficient manner. Features and details of the invention will appear from the specification and claims.

A preferred embodiment of the invention is illustrated in the accompanying drawing as follows:—

Fig. 1 shows a sectional view of the float chamber and U-tube of an orifice meter.

Fig. 2 an enlarged section on the line 2—2 in Fig. 1.

Fig. 3 an enlarged view of the screw closing a grease opening for the spindle bearing.

Fig. 4 an end view of the screw shown in Fig. 3.

Fig. 5 an elevation of a tool for operating the screw shown in Fig. 3.

Fig. 6 a sectional view through the mechanism communicating movement from a displacement meter to its register.

Fig. 7 an end view of a bearing plug forming a feature of the invention.

1 marks a conduit, 2 a metering orifice in the conduit, 3 a float chamber, 4 a pipe connecting the float chamber with the conduit, 5 a U-tube, and 6 a connection between the U-tube and the conduit. A float 7 is arranged in the chamber 3. The float operates a rock lever 8 extending into an opening 9 in a wall 10 of the float chamber. The rock lever 8 has an enlarged end 11 through which a spindle 12 extends, the rock lever being locked on the spindle by means of a screw 13, the spindle being provided with a flat 14 so as to more certainly assure the locking of the arm with the spindle.

The spindle extends through an opening 15 in the wall, one end of the spindle having a reduced end 16 in a bearing socket 17 in an adjusting screw 18. The adjusting screw operates in a screw-threaded opening 19 in a closure plug 20.

The spindle 12 has an extension 21 of small diameter. This extension passes through a plug 22. The spindle at the point at which it is reduced to the size of the extension has a bearing shoulder 23 which operates against a seat 23a in the plug 22. This seat receives the end thrust incident to the pressure within the float chamber.

The plug 22 is arranged in a hollow fitting 24. This fitting is screwed into a screw-threaded socket 25 in the wall 10. It has a grease chamber 26 which surrounds the extension on the spindle. The outer end of the fitting 24 is provided with a tapered opening 27 and a tapered bearing plug 28 fits in this opening. The bearing plug has a bearing opening 29 for the spindle. A flanged nut 30 is arranged on screw threads 31 on the end of the fitting 24, the nut engaging the tapered plug 28 and exerting adjusting pressure on this plug.

I have discovered that a solid plug can readily be compressed sufficiently to adjust the size of the bearing opening through it to make a perfect fit with the spindle. The taper of the plug should be such that it will readily follow outwardly as the flanged nut is released so that in adjusting it the plug may be compressed, or expanded, to assure a perfect fit and yet give freedom between the spindle and the plug. This plug may be made of softer material, but preferably is made of tempered steel. It is thus possible to get a fit that is impractical within commercial practice. In fact the perfect fit may be made just as free, or just as tight, as the conditions will permit.

The usual pen arm 32 is secured to the outer end of the spindle. A static pressure pipe 33 leads to a pressure spring 34 surrounding the fitting 24. This spring operates a pen arm 35. A grease opening 36 leads to the chamber 26 and has a screw-threaded opening 37 leading to the opening 36. A closure screw 38 is arranged in the opening. This has a wrench-hold 39 and a guide pin 40. A screw driver 41 has a perforation 42 for receiving the guide pin 40 and a slot 43 for receiving the wrench-hold. By means of this, the screw may be removed, or replaced so as to control the opening. Thus the opening to the chamber 26 may be made within the pressure spring and grease from an ordinary grease nozzle may be delivered to the opening within the spring.

In Fig. 6 I have shown the bearing as applied to a displacement meter. In this a spindle 44 is driven by a crank 45 which is adapted to receive motion from the operating bellows part of the meter. A crank 46 at the upper end of the spindle communicates movement to a crank 47 which extends into and drives the registering mechanism 48. A wall 49 separates a pressure receptacle forming a part of the meter and a registering compartment. This wall is provided with a tapered socket, or opening 50 in which is arranged a tapered plug 51, the plug having a bearing opening 52 for receiving the spindle 44. A screw 53 is arranged in a screw-threaded socket 54 in the wall 49 and is adapted to exert adjusting pressure on the tapered plug. By removing the registering mechanism through the removal of the screws 55 access to the pressure-adjusting screw 53 may be had so that a nice adjustment of this bearing may be maintained.

What I claim as new is:—

1. In a joint, the combination of a bearing support having a tapered socket; a spindle; a continuous plug of hard resilient metal having a bearing opening for the spindle and a tapered outer surface, said plug being arranged in the tapered socket and having close bearing surface contact with the spindle; and means adjusting pressure on the plug in the socket to vary the size of the bearing opening.

2. In a joint, the combination of a bearing support having a tapered socket; a spindle; a continuous plug of hard resilient metal having a bearing opening for the spindle and a tapered outer surface, said plug being arranged in the tapered socket and having close bearing surface contact with the spindle; and a flanged nut on the bearing support exerting adjusting pressure on the plug in the socket for varying the size of the bearing opening.

3. In a joint mechanism, the combination of a pressure receptacle; a sealed joint leading from the receptacle comprising a wall having a tapered socket; a spindle extending from within the receptacle through the socket; a continuous plug of hard resilient metal having a bearing opening for the spindle and a tapered outer surface, said bearing plug being arranged in the socket and having close bearing and sealing surface contact with the spindle; and means exerting adjusting pressure on the plug in the socket to vary the size of the bearing opening.

4. In a joint mechanism, the combination of a pressure receptacle; a sealed joint leading from the receptacle comprising a wall having a tapered socket; a spindle extending from within the receptacle through the socket; a continuous plug of hard resilient metal having a bearing opening for the spindle and a tapered outer surface, said bearing plug being arranged in the socket and having close bearing and sealing surface contact with the spindle; means exerting adjusting pressure on the plug in the socket to vary the size of the bearing opening; and a grease chamber communicating with the receptacle and leading to the socket.

5. In a joint mechanism, the combination of a pressure receptacle; a sealed joint leading from the receptacle comprising a wall having a tapered socket; a spindle extending from within the receptacle through the socket; a continuous plug of hard resilient metal having a bearing opening for the spindle and a tapered outer surface, said bearing plug being arranged in the socket and having close bearing and sealing surface contact with the spindle; means exerting adjusting pressure on the plug in the socket to vary the size of the bearing opening; a shoulder on the spindle within the receptacle; and a bearing for the shoulder.

ARNO R. HUETTIG.